(12) United States Patent
Shimanuki et al.

(10) Patent No.: US 6,805,988 B2
(45) Date of Patent: Oct. 19, 2004

(54) HUMIDIFYING APPARATUS FOR FUEL CELL

(75) Inventors: Hiroshi Shimanuki, Wako (JP); Kouji Katano, Wako (JP); Yoshio Kusano, Wako (JP); Toshikatsu Katagiri, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 544 days.

(21) Appl. No.: 09/972,667

(22) Filed: Oct. 5, 2001

(65) Prior Publication Data

US 2002/0041989 A1 Apr. 11, 2002

(30) Foreign Application Priority Data

Oct. 5, 2000 (JP) ........................................ 2000-306746

(51) Int. Cl.[7] .............................................. H01M 2/02
(52) U.S. Cl. .............................. 429/34; 429/13; 429/19; 429/20; 429/22; 429/24; 429/26; 429/39; 261/96; 261/99; 261/102; 261/104; 261/142; 261/154
(58) Field of Search .............................. 429/34, 13, 19, 429/20, 22, 24, 26, 39; 261/96, 99, 102, 104, 142, 154

(56) References Cited

U.S. PATENT DOCUMENTS

| | | | | |
|---|---|---|---|---|
| 4,480,683 A | * | 11/1984 | Wollbeck et al. | ............. 165/70 |
| 6,156,096 A | * | 12/2000 | Sirkar | ............. 95/44 |
| 2002/0177017 A1 | * | 11/2002 | Nelson et al. | ............. 429/22 |

* cited by examiner

Primary Examiner—Randy Gulakowski
Assistant Examiner—Gentle E. Winter
(74) Attorney, Agent, or Firm—Lahive & Cockfield, LLP; Anthony A. Laurentano, Esq.

(57) ABSTRACT

A more compact humidifying apparatus for a fuel cell can be implemented. In the present invention, hydrogen humidifying modules 30A and 30B are disposed so as to be separated vertically on the front surface side of the humidifying unit 20, the air humidifying modules 30C and 30D are disposed separated vertically on the back side surface thereof, and the air humidifying modules 30E is disposed at the center, surrounded by the humidifying modules 30A, 30B, 30C, and 30D. The axis direction of all of the humidifying modules 30A to 30E are disposed so as to be parallel to each other, only the hydrogen humidifying module 30A is disposed so that its position is shifted to the left (the longitudinal direction) of the axial direction of the other humidifying modules 30A to 30E, and the air off gas discharge pipes 43 of the air humidifying modules 30C to 30E are disposed in the space formed by this shift.

1 Claim, 7 Drawing Sheets

HUMIDIFYING APPARATUS FOR FUEL CELL

BACKGROUND OF THE INVENTION

1. Field of the Invention

The present invention relates to a humidifying apparatus for a water permeable fuel cell that uses, for example, a hollow fiber membrane.

2. Description of the Related Art

A fuel cell mounted on a fuel cell vehicle has a structure wherein an electrode membrane structure providing an anode electrode and a cathode electrode on either side of a solid polymer electrolyte membrane is laminated on a separator that forms the gas passage for supplying various reaction gasses to both sides of this electrode membrane structure and at the same time supports the electrode membrane structure from both sides.

In this fuel cell, hydrogen gas is supplied to the anode electrode as a reaction gas for the fuel, and oxygen or air is supplied to the cathode electrode as a reaction gas for oxidation, and the chemical energy involved in the oxidation-repipeion reaction of these gases is extracted as direct electrical energy.

That is, at the anode electrode side the hydrogen gas is ionized and diffuses through a solid polymer electrolyte, and the electrons migrate to the cathode electrode side by passing through the external load, and the electrical energy can be extracted by a series of electrochemical reactions that generate water by reacting with oxygen.

However, in this fuel cell, when the solid polymer electrolyte membrane dries out, the ion conductivity decreases, leading to a decrease in the energy conversion efficiency Therefore, in order to maintain satisfactory ion conduction, moisture must be supplied to the solid polymer electrolyte membrane.

In order to attain this object, in this type of fuel cell, a humidifying apparatus is provided that supplies the reaction gas for the fuel and the reaction gas for the oxidizing agent after they have been humidified, supplies moisture to the solid polymer electrolyte membrane, and thereby maintains the satisfactory reaction.

A water permeable humidifying apparatus providing a hollow fiber membrane that permits the permeation of steam in the direction of the thickness of the membrane, such as that disclosed in Japanese Unexamined Patent Application, First Publication, No. Hei 8-273687, is known as a humidifying apparatus of this type.

Figure 8:
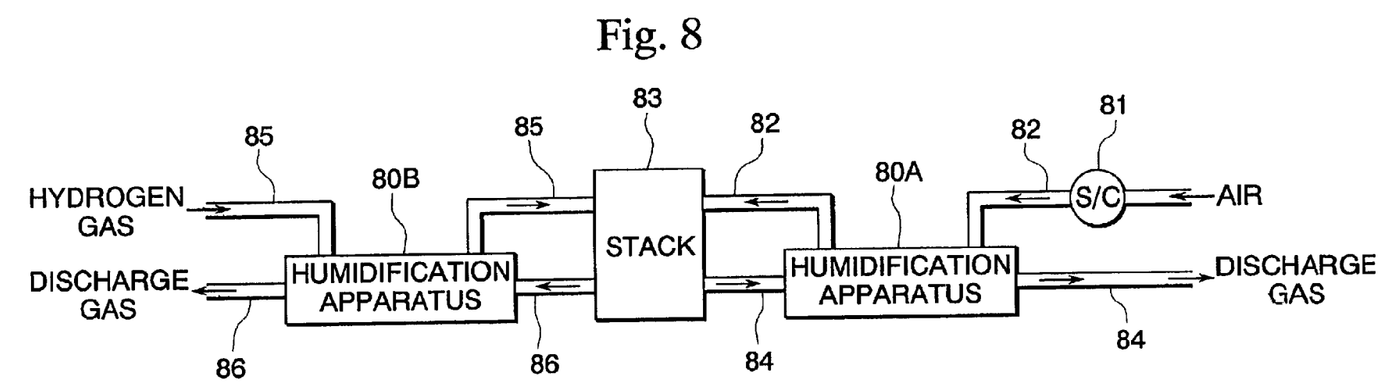
FIG. 8 is a structural drawing of the system of the fuel cell providing the conventional humidifying apparatus for a fuel cell.

FIG. 8 is a structural diagram of a fuel cell system providing the conventional humidifying apparatus. The air that is used as a reaction gas for the oxidizing agent is pressurized by the super charger 81, supplied to the humidifying apparatus 80A on the cathode electrode side via the pipe 82 for the reaction gas for the oxidizing agent, and supplied to the cathode electrode of the fuel cell 83 (below, referred to as the FC stack) after being moisturized in the humidifying apparatus 80A on the cathode electrode side. In addition, after the oxygen in the air supplied to the cathode electrode is used as the oxidizing agent, it is discharged from the FC stack 83 as off gas. The off gas that includes moisture generated during the reaction in the FC stack 83 is sent to the humidifying apparatus 80A on the cathode electrode side via the pipe 84 for the off gas from the FC stack 83, the steam in the off gas in the humidifying apparatus 80A on the cathode electrode side is taken up by the reaction gas for the oxidizing agent, and thereafter, is discharged.

In addition, the hydrogen gas used as the reaction gas for the fuel is supplied to the humidifying apparatus 80B on the anode electrode side via the gas pipe 85 for the fuel supply, is moisturized in the humidifying apparatus 80B on the anode electrode side, and then supplied to the anode electrode of the FC stack 83. In addition, a part of the oxygen supplied to the anode electrode is used as fuel and supplied to the oxidation-reduction reaction. After this one part of the oxygen gas has been supplied to the reaction, it becomes off gas and is discharged from the FC stack 83.

However, the solid polymer electrolyte membrane possesses the property that steam is caused to permeate from the side having a high moisture concentration to the side having a low concentration, where the solid polymer electrolyte membrane serves as a boundary, as a result of the ion hydration effect. As described above, the moisture concentration of the off gas flowing through the cathode electrode side is higher than that of the off gas flowing through the anode electrode side because it includes moisture generated during the reaction, but due to the ion hydration effect, the moisture in the off gas flowing through the cathode electrode side becomes steam, permeates the solid polymer electrolyte membrane, and diffuses into the off gas flowing through the anode electrode side. Therefore, moisture is included in the off gas on the anode electrode side.

The off gas on the anode electrode side that includes this moisture is sent to the humidifying apparatus 80B on the anode electrode side from the FC stack 83 via the off gas pipe 86, the steam in the off gas in the humidifying apparatus 80B on the anode electrode side is delivered to the reaction gas for the fuel, and subsequently, discharged.

Figure 7:
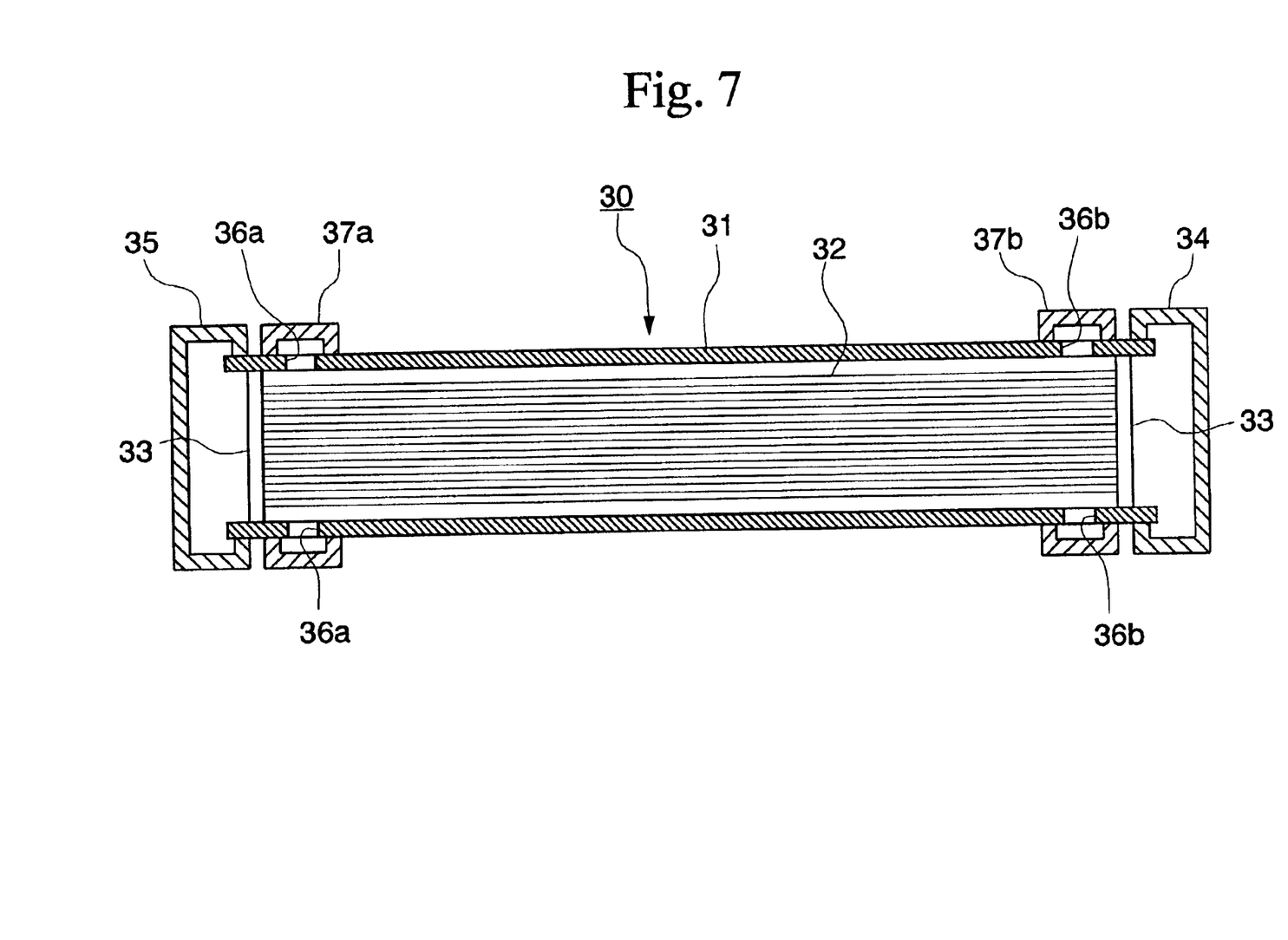
FIG. 7 is a cross-sectional diagram of the humidifying module.

Here, a humidifying module, which is the essential structural component of the humidifying apparatus 80A on the cathode electrode side and the humidifying apparatus 80B on the anode electrode side, will be explained referring to FIG. 7.

In the humidifying module 30, a plurality of bundled tube shaped porous hollow fiber membranes 32 comprising a steam permeable membrane (water permeable membrane) are accommodated, partition members 33 that bundle both ends of the hollow fiber membranes 32 are joined airtight to the outer surface of the hollow fiber membrane 32 or the inner surface of the hollow fiber membrane 32 and the outer peripheral surface of the housing 31. One end of the housing 31 communicates with the inlet head 34, and the other end communicates with the outlet head 35. In addition, gas inlet holes 36a and gas outlet holes 26b are provided more inward than both of the partition members 33, which are the peripheral part of the housing 31. The gas inlet holes 36a and gas outlet holes 36b communicate with an round internal passage of the round inlet cover 37a and the round outlet cover 37b that are respectively provided along the exterior peripheral surface of the housing 31.

In addition, in this humidifying module 30, the reaction gas is supplied to the round internal passage of the round inlet cover 37a, is introduced into the housing 31 from the gas inlet hole 36a, and flows in the round internal passage of the round outlet cover 37b from the outlet hole 36b after passing through the hollow fiber membrane 32 in the housing 31. In contrast, the off gas is supplied to the inlet head 34, enters into hollow part of the hollow fiber membrane 32 after being supplied to the housing 31 from the inlet head 34, and flows to the outlet head 35 from the other end of the housing 31 after passing through this hollow part. When the reaction gas and the off gas are caused to flow in this manner, the moisture in the off gas is taken up by the reaction gas via the hollow fiber membrane 32, and thereby, the reaction gas is humidified. Moreover, as one manner of using the humidifying module 30, the off gas can flow into the hollow part of the hollow fiber membranes 32, and the reaction gas can flow between the hollow fiber membranes 32, and in this manner as well, the moisture in the off gas can be taken up by the reaction gas via the hollow fiber membrane 32 to produce the humidifying.

In addition, the humidifying apparatus 80A on the cathode electrode side and the humidifying apparatus 80B on the anode electrode side can be provided with a plurality of humidifying modules 30, and in this case, the reaction gas supply pipes communicate with the inlet head 34 of each of the humidifying modules 30, the reaction gas discharge pipe communicates with the outlet head 35 of each of the humidifying modules 30, the off gas supply pipe communicates with the round outlet cover 37a of each of the humidifying modules, and the off gas discharge pipe communicates with the round outlet cover 37b of each of the humidifying modules 30.

Conventionally, the humidifying apparatus 80A on the cathode electrode side and the humidifying apparatus 80B on the anode electrode side are provided respectively as separate units, but there is the problem that the installation space becomes large. As a countermeasure for this problem, downsizing the installation space by combining both humidifying units 80A and 80B into one unit has been proposed.

In this case, generally all of the modules 30 for humidifying on the cathode electrode side and for humidifying on the anode electrode side are disposed so as to be parallel to each other in their longitudinal directions, and the ends of the inlet heads 34 and the outlet heads 35 of all of the humidifying modules 30 are disposed arranged on the same plane.

In the humidifying module 30, the four passages for the reaction gas supply, the reaction gas discharge, the off gas supply, and the off gas discharge must be connected, and in the case that the humidifying module 30 for the cathode electrode side and the humidifying module 30 for the anode electrode side are made into a unit, twice the number, or eight, passages must be connected in the unit.

However, as described above, when the end surfaces of the heads 34 and 35 of all the humidifying modules 30 are disposed so as to be aligned, and many of the paths among the eight paths are arranged on the same plane in the direction that is perpendicular to the longitudinal direction of the humidifying module on the outside end surface of the humidifying module 30, there are cases where the passages interfere with each other and cannot be easily arranged. Therefore, in the case that they cannot be easily arranged, the passages must be arranged so as to be shifted in the longitudinal direction of the humidifying module 30. However, when arranged in this manner, the length in the longitudinal direction of the humidifying module in the entire unit that includes the passages becomes long, and there is the problem that it cannot be formed compactly.

Thus, the present invention provides a humidifying apparatus for a fuel cell that allows the humidifying module for the cathode electrode side and the humidifying module for the anode electrode side to be formed compactly in one unit.

SUMMARY OF THE INVENTION

In order to resolve the above-described problems, the present invention provides a humidifying apparatus for a fuel cell (for example, the humidifying unit 20 in the embodiment described below) that provides a plurality of humidifying modules (for example, the humidifying modules 30A to 30E in the embodiment described below) that humidify the supplied gases by moisture being diffused between a reaction gas (for example, the air and hydrogen gas in the embodiment described below) supplied to the fuel cell for (for example, the FC stack 6 in the present embodiment described below) and the discharge gas (for example, the air off gas and the hydrogen off gas in the embodiment described below) discharged from the fuel cell and humidifies each of both electrodes of the fuel cell, wherein: all of the plurality of humidifying modules are disposed parallel to each other in their longitudinal direction, and at the same time, a portion of the humidifying modules among the plurality of humidifying modules (for example, the hydrogen humidifying module 30A in the embodiment described below) is disposed so as to shift their positions in the longitudinal direction from the other humidifying modules (for example, the hydrogen humidifying module 30B and he air humidifying modules 30C to 30E in the embodiment described below), and in the space formed by this shift (for example, the space S in the embodiment described below), a part of the path (for example, the air off gas discharge pipe 43 in the embodiment described below) that the reaction gas and the discharge gas pass through is perpendicular to the longitudinal direction and provided in proximity to the portion of humidifying modules.

Due to being structured in this manner, the length along the axial direction of the humidifying module in the humidifying apparatus for a fuel cell can be shortened.

DETAILED DESCRIPTION OF THE INVENTION

Below, an embodiment of the humidifying apparatus for a fuel cell according to the present invention will be explained referring to FIG. 1 to FIG. 6. Moreover, this embodiment is shown applied to a humidifying apparatus for a fuel cell mounted in a vehicle that uses a fuel cell.

Figure 1:
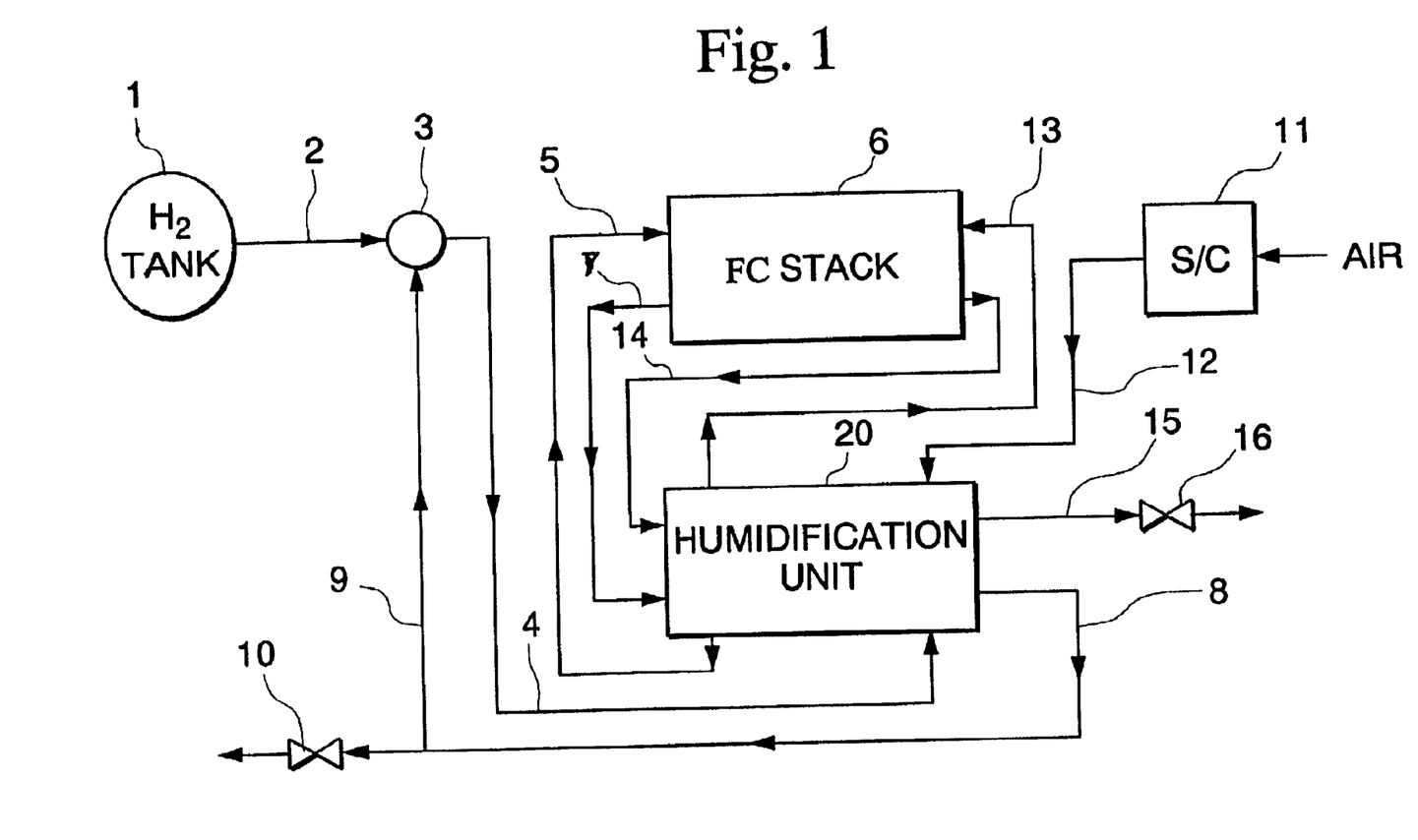
FIG. 1 is a structural drawing of the system of the fuel cell providing the humidifying apparatus for a fuel cell according to this invention.

First, referring to FIG. 1, the structure as a whole of the fuel cell system providing the humidifying apparatus for a fuel cell will be explained.

The hydrogen gas that will serve as the reaction gas for the fuel supplied from the hydrogen storage tank 1 is supplied to the humidifying unit (the humidifying apparatus for the fuel cell) 20 after passing through the hydrogen supply pipe 2, the ejector 3, and the hydrogen supply pipe 4, and after being humidified in the humidifying unit 20, is supplied to the anode electrode of the fuel cell 6 (below, referred to at the "FC stack") via the hydrogen supply pipe 5.

In addition, a part of the hydrogen supplied to the anode electrode is used as fuel, and supplied to the oxidation-repipeion reaction. After a part of the hydrogen gas serves in the reaction, it is supplied to the humidifying unit 20 via the oxygen off gas discharge pipe 7, it is discharged from the FC stack 6 (below, referred to as hydrogen off gas), supplied to the humidifying unit 20 via the hydrogen off gas discharge pipe 7, and in the humidifying unit 20, after this hydrogen is humidified, it flows out to the hydrogen off gas discharge pipe 8. The hydrogen off gas discharged by the hydrogen off gas discharge pipe 8 can be supplied to the ejector via the hydrogen off gas return pipe 9, and at the same time, can become discharge by passing through the discharge valve 10.

The ejector 3 draws the hydrogen off gas introduced from the hydrogen off gas return pipe 9 due to the negative pressure generated by the flow of the hydrogen gas supplied from the hydrogen supply pipe 2 to the ejector 3, and the mixed gas comprising the hydrogen gas and the hydrogen off gas is supplied to the humidifying unit 20.

The air serving as the reaction gas for the oxidizing agent is pressurized by the super charger 11, supplied to the humidifying unit 20 via the air supply pipe 12, and after being humidified in the humidifying unit 20, is supplied to the cathode electrode of the FC stack 6 via the air supply pipe 13. In addition, after the oxygen in the air supplied to the cathode electrode is used as the oxidizing agent, this air becomes off gas (below, referred to as the "air off gas"), is discharged from the FC stack 6, supplied to the humidifying unit 20 via the air off gas discharge pipe 14, and after humidifying this air in the humidifying unit 20, is discharged to the air off gas discharge pipe 15, and discharged via the pressure control valve 16. Moreover, the pressure control valve 16 is a valve that adjusts the internal pressure of the FC stack 6.

Next, the humidifying unit 20 will be explained referring to FIG. 2 through FIG. 6.

In the humidifying unit 20, the humidifying module for humidifying the hydrogen gas and the humidifying module for humidifying the air are formed as one unit together in one location, and two hydrogen humidifying modules 30A and 30B for the hydrogen humidifying and three air humidifying modules 30C, 30D, and 30E for air humidifying are provided.

The humidifying modules 30A through 30E all have identical dimensions, shape, and structure, and their structures are the same as the conventional humidifying module shown in FIG. 7, and thus their explanations will be omitted, and in the following explanation, FIG. 7 will be used.

Figure 2:
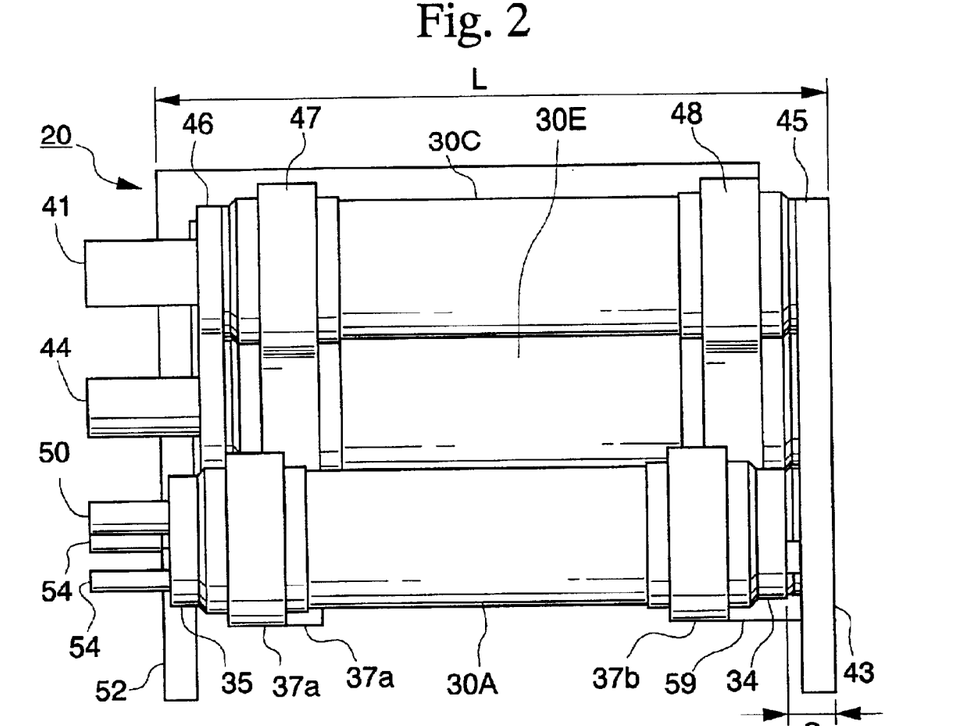
FIG. 2 is a planar drawing of the humidifying unit in this embodiment.
Figure 3:
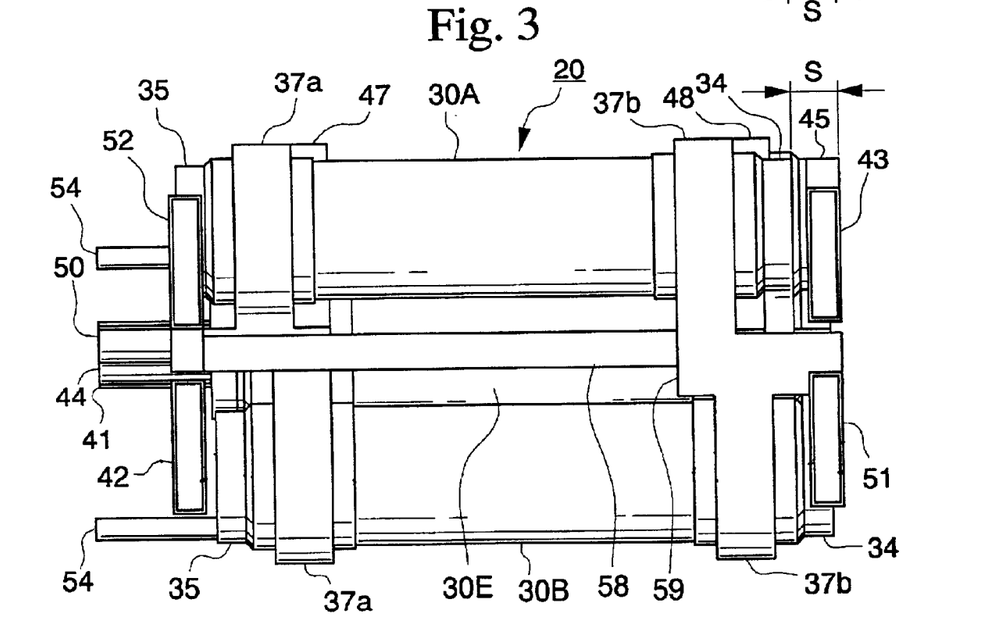
FIG. 3 is a frontal drawing of this humidifying unit.
Figure 4:
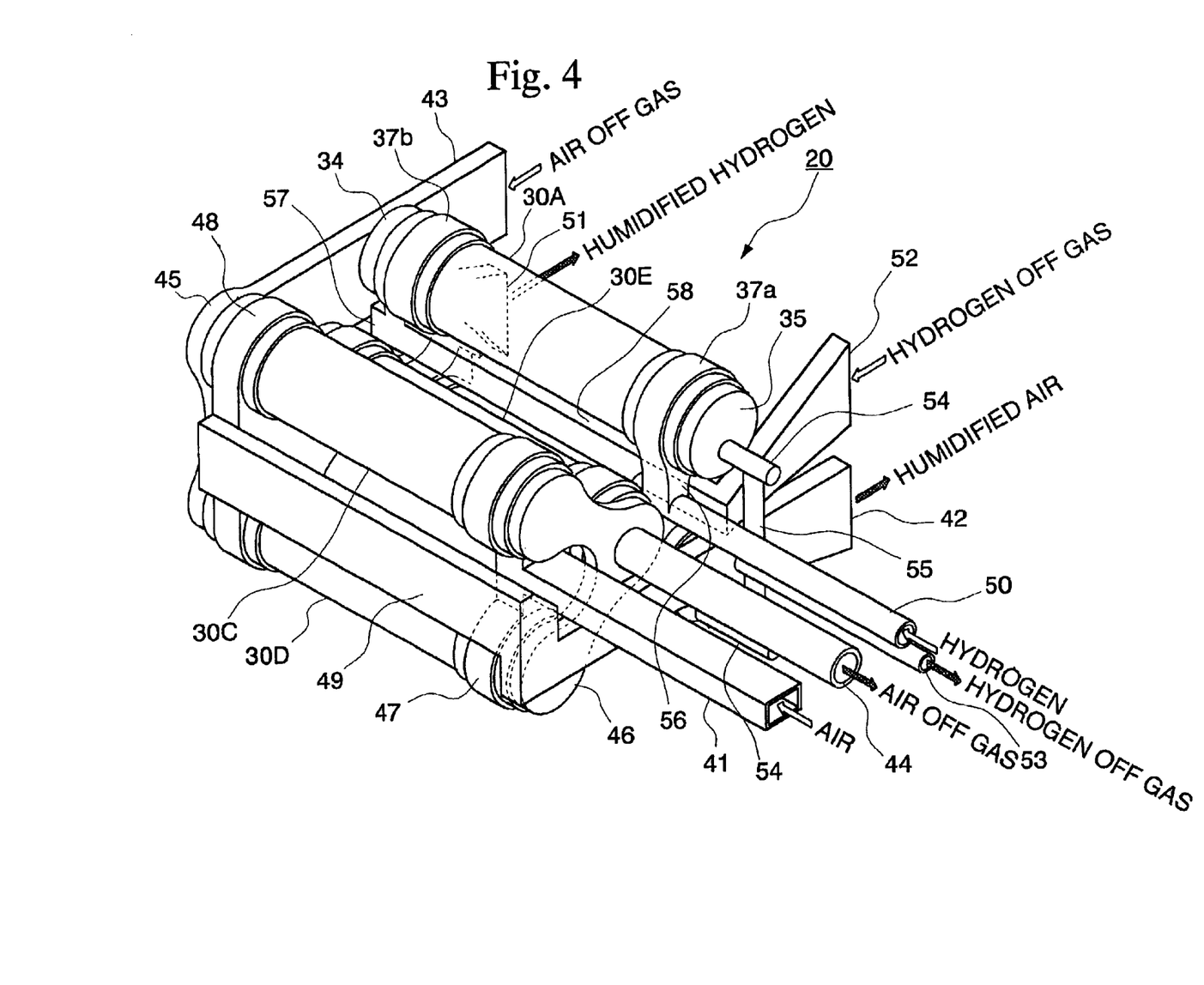
FIG. 4 is a perspective view of the humidifying unit.

FIG. 2 is a planar drawing of the humidifying unit 20, FIG. 3 is a frontal view of the same, and FIG. 4 is a perspective drawing viewing the humidifying unit 20 at an angle from the back on the left. Below, for the sake of convenience in the explanation, simply stating the "left side" (or the "right side") will denote the left side (or right side) of the humidifying unit 20, and in FIG. 2 and FIG. 3, will denote the left side (or right side) of the figure itself. In addition, In addition, simply stating "right side" (or "left side") denotes the right side (or left side) of the humidifying unit 20, and in FIG. 2 and FIG. 3, denotes the right side (or left side) of the figure itself.

The humidifying modules 30A to 30E are disposed so as to be parallel to each other along the axial direction (the longitudinal direction) of the housing 31, and in addition, all of the humidifying modules 30A to 30E have their inlet heads 34 positioned on the right side, and the outlet heads 35 positioned on the left side.

Additionally, the hydrogen humidifying modules 30A and 30B are positioned so as to be vertically separated on the front surface side of the humidifying unit 20, the air humidifying modules 30C and 30D are positioned so as to be vertically separated on the back side, and the remaining air humidifying module 30E is positioned at the center part so as to be surrounded by these humidifying modules 30A, 30B, 30C, and 30D. In other words, with respect to the humidifying unit 20, the hydrogen humidifying module 30A is positioned above and forward, the air humidifying module 30C is positioned above and behind, the hydrogen humidifying module 30B is positioned below and forward, the air humidifying module 30D is positioned below and behind, and the one remaining air humidifying module 30E placed between the humidifying modules 30A to 30D.

Furthermore, except for the hydrogen humidifying module 30A, the four humidifying modules, or specifically the hydrogen humidifying module 30B and the air humidifying modules 30C, 30D, and 30E, are positioned such that the end surfaces of their inlet heads 34 are aligned on one plane, and only the hydrogen humidifying module 30A is positioned so as to be shifted further to the left side than the inlet heads 34 of the other humidifying modules 30B to 30E. In other words, only the hydrogen humidifying module 30A is positioned so as to be shifted to the left in the axial direction (the longitudinal direction) with respect to the other humidifying modules 30B to 30E.

Figure 5:
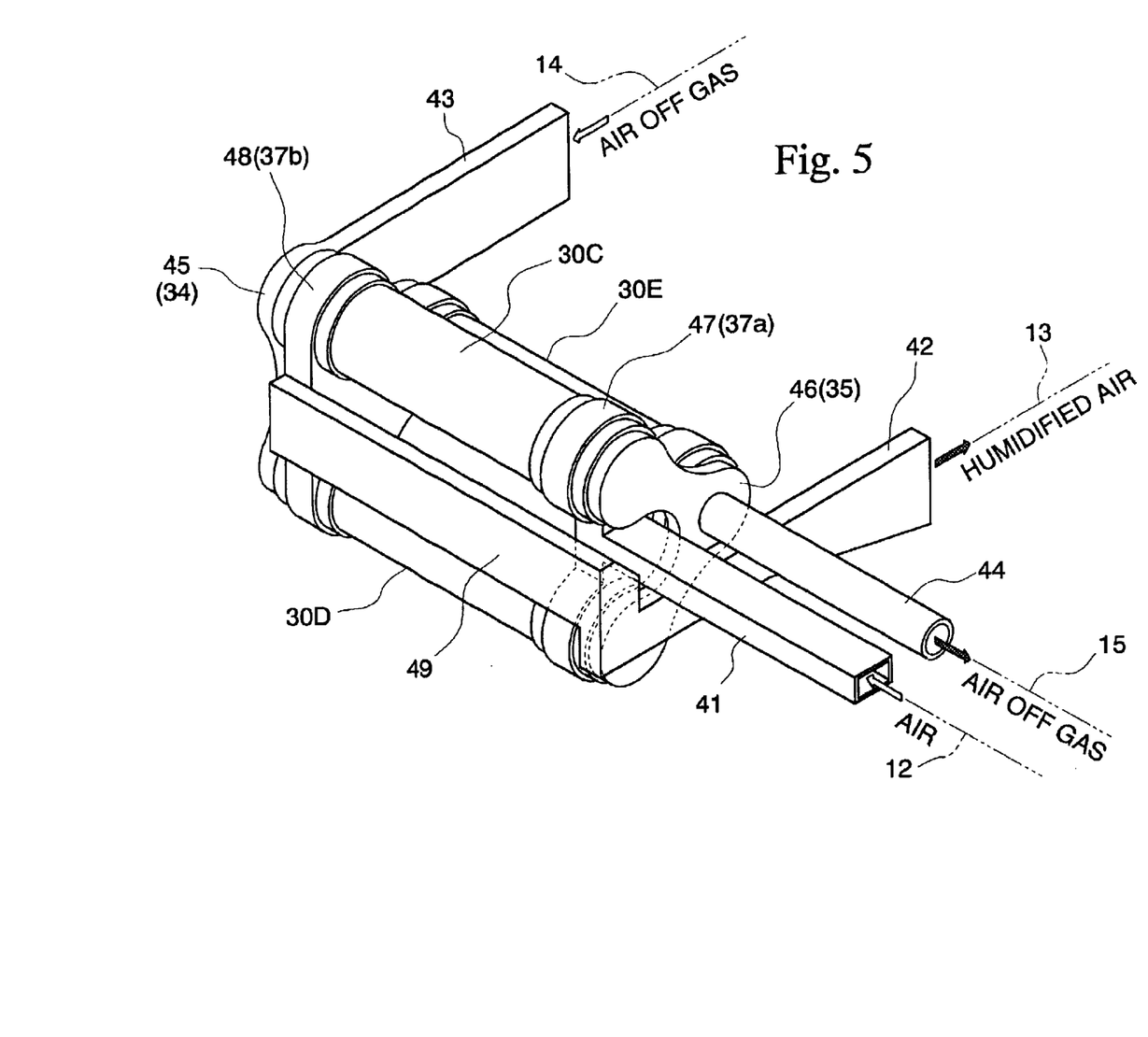
FIG. 5 is a perspective view of the hydrogen humidifying module and the paths that pass therethrough in this humidifying unit.

FIG. 5 is a perspective drawing of the assembly of the air humidifying modules 30C to 30E viewed from the same direction as FIG. 4. The air supply pipe 12 is connected to the air supply pipe 14, which extends horizontally to the left along the axial direction of the air humidifying modules 30D to 30E. The air supply pipe 13 is disposed on the lower left of the front surface, and is connected to the air supply pipe 42, which extends forward perpendicular to the axial direction of the air humidifying modules 30C to 30E. The air off gas discharge pipe 14 is disposed on the upper right of the front surface, and is connected to the air off gas discharge pipe 43, which extends forward perpendicular with respect to the axial direction of the air humidifying modules 30C to 30E. The air off gas discharge pipe 15 is connected to the air off gas discharge pipe 44, which extends horizontally to the left along the axial direction of the air humidifying modules 30C to 30E.

In the air humidifying modules 30C to 30E, each of the inlet heads 23 communicate on the same surface to form an inlet head block 45, each of the outlet heads 35 communicate on the same surface to form an outlet head block 46, each of the round inlet covers 37a communicate on the same surface to form the round inlet cover block 47, and each of the round outlet covers 37b communicate on the same surface to form the round outlet cover block 48.

The air supply pipe 41 is positioned at the same height as the center of the axis of the air humidifying module 30E, and is disposed behind the air humidifying module 30E. The distal end of this air supply pipe 41 communicates with the round inlet cover block 47.

In addition, the center of the axis of the air off gas discharge pipe 44 is positioned on the same axis as the center of the axis of the air humidifying module 30E, and the distal end of this air off gas discharge pipe 44 communicates with the outlet head block 46.

The axis of the center of the air off gas discharge pipe 43 is positioned at the same height as the center of the axis of the air humidifying module 30C, and at the same time, is positioned on the same surface as the inlet head block 45, and the distal end of this air off gas discharge pipe 43 communicates with the inlet head block 45.

In addition, the round outlet cover block 48 communicates with the air off gas discharge pipe 49, which extends parallel to and at the same height as the center of the axis of the air humidifying module 30E on the back surface side of the humidifying unit 20. After extending to the left of the humidifying unit 20, the air off gas discharge pipe 49 is bent downward at a position that does not interfere with the outlet head block 46, and furthermore, is connected to the air supply pipe 42 by being bent in front of the humidifying unit 20 at a position that does not interfere with the air supply pipe 41 and the air off gas discharge pipe 44. The air supply pipe 42 passes the immediate left side of the outlet head block 46.

Figure 6:
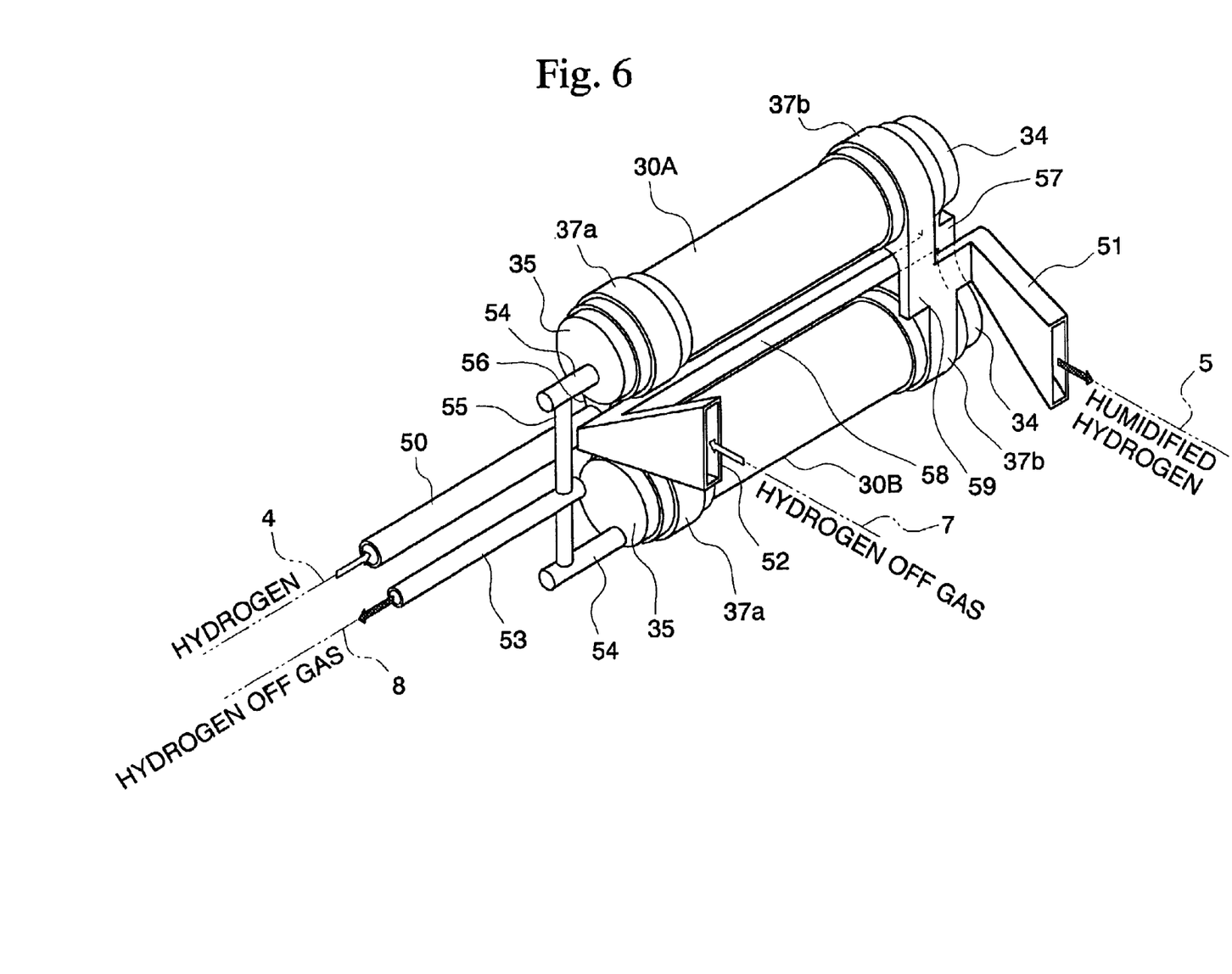
FIG. 6 is a perspective view of the hydrogen humidifying module and the paths that pass therethrough in this humidifying unit.

FIG. 6 is a perspective drawing of the assembly of the hydrogen humidifying modules 30A and 30B viewed from an angle in front from the left. The hydrogen supply pipe 4 is connected to the hydrogen supply pipe 50, which extends parallel to the left along the axial direction of the hydrogen humidifying modules 30A and 30B. The hydrogen supply pipe 5 is disposed on the lower right of the front surface, and is connected to the hydrogen supply pipe 51, which extends forward perpendicular to the axial direction of the hydrogen humidifying modules 30A and 30B. The hydrogen off gas discharge pipe 7 is disposed on the upper left of the front surface, and is connected to the hydrogen off gas discharge pipe 52, which extends forward perpendicular to the axial direction of the hydrogen humidifying modules 30A and 30B to be positioned on the upper left front surface. The hydrogen off gas discharge pipe 8 is connected to the hydrogen off gas discharge pipe 53, which extends parallel to the left along the axial direction of the hydrogen humidifying modules 30A and 30B.

As explained above, the hydrogen humidifying module 30A is positioned shifted more to the left than the hydrogen humidifying module 30B, and thus the inlet heads 34 cannot by joined on the same surface, and the same holds for the outlet head 35, round inlet covers 37a, the round outlet covers 37b.

Thereby, the outlet pipe 54 extends to the left in the axial direction from each of the outlet heads 35 of the hydrogen humidifying modules 30A and 30B, and the both outlet pipes 54 and 54 are connected by the communicating pipe 55, which extends in a vertical direction, and the hydrogen supply pipe 53 connects substantially to the center of the communicating pipe 55 to communicate therewith.

In addition, each of the round inlet covers 37a of the hydrogen humidifying modules 30A and 30B communicate substantially at the center of both humidifying modules 30A and 30B in the height direction at the back surface side of the hydrogen humidifying modules 30A and 30B, and the distal end of the hydrogen supply pipe 50 connects to this communicating part 56 to communicate therewith.

Furthermore, each of the inlet heads 34 of the hydrogen humidifying modules 30A and 30B communicate with each other substantially at the center of both humidifying modules 30A and 30B in the height direction at the front surface side of the hydrogen humidifying modules 30A and 30B. The right end of the hydrogen gas discharge pipe 58, which extends parallel to the front surface side of the hydrogen humidifying modules 30A and 30B, connects to this connecting part 57, and the left end of this hydrogen off gas discharge pipe 58 communicates with the hydrogen off gas discharge pipe 52, which is bent upward in front of the humidifying unit 30 directly under the outlet head 35 of the hydrogen humidifying module 30A.

In addition, each of the round outlet covers 37b of the hydrogen humidifying modules 30A and 30B communicate substantially at the center of both humidifying modules 30A and 30B in the height direction at the front surface side of the hydrogen humidifying modules 30A and 30B. This communicating part 59 extends parallel to the right, and is connected to the hydrogen supply pipe 51, which is bent downward in front of the humidifying unit 20 at a position that has substantially the same surface as the inlet head 34 of the hydrogen humidifying module 30B.

At this humidifying unit 20, as shown in FIG. 3, the air supply pipe 42 that passes on the immediate left side of the outlet bead block 46 of the air humidifying modules 30C to 30E, as was explained above, passes to the immediate left side of the outlet head 35 of the air humidifying module 30B. This is because the air humidifying module 30B is disposed at a position in the axial direction identical to that of the air humidifying modules 30C to 30E. In addition, as shown in FIG. 3 and FIG. 4, the air supply pipe 42 passes between the outlet pipes 54 and 54 of the air humidifying modules 30A and 30B, and at the same time passes below the hydrogen supply pipe 50, and is disposed so as not to interfere with them.

As shown in FIG. 3, on the left side of the humidifying unit 20, the hydrogen off gas discharge pipe 52 and the air supply pipe 42 are disposed by being arranged vertically on the same diagonal surface. Even if disposed in this manner, the air supply pipe 42 and the hydrogen off gas discharge pipe 52 do not interfere and thus the left end of the hydrogen off gas discharge pipe 58 that communicates with the hydrogen off gas discharge pipe 52 is bent upward towards in front of the humidifying unit 20, as was described above.

In contrast, as shown in FIG. 3 and FIG. 4, the air off gas discharge pipe 43 passes on the immediate right side of the inlet head 34 of the hydrogen humidifying module 30A, and is in proximity to the humidifying module 30A. This means that the air off gas discharge pipe 43 is inserted in a space S that is formed by disposing the hydrogen humidifying module 30A so as to be shifted to the right in the axial direction (the longitudinal direction) of the humidifying modules 30B to 30E (in this embodiment, in particular the air humidifying modules 30C to 30E). Looking at this from the opposite direction, the hydrogen humidifying module 30A is disposed so as to be shifted to the right in the axial direction of the other humidifying modules 30B to 30E only by the minimum dimensions necessary for the passage of the air off gas discharge pipe 43.

In addition, on the right side of the humidifying unit 20, the air off gas discharge pipe 43 and the hydrogen supply pipe 51 are disposed by being arranged vertically on identical diagonal surfaces. Even if arranged in this manner, the air off gas discharge pipe 43 and the hydrogen supply pipe 51 do not interfere with each other, and thus the right end of the communicating part 59 that communicates with the round outlet covers 37b and 37b of the hydrogen humidifying modules 30A and 30B are bent downward to the front of the humidifying unit 20 as described above.

In the humidifying unit 20 structured in this manner, the air off gas discharge pipe 43 is disposed in a space S that is formed by disposing the hydrogen humidifying module 30A so as to be shifted to the left in the axial direction of the other humidifying modules 30B to 30E, and thereby the length L (refer to FIG. 2) in the axial direction from the end surface on the left side of the hydrogen off gas discharge pipe 52 and the air supply pipe 42 can be shortened, and the humidifying unit 20 that combines into one the hydrogen humidifying modules 30A and 30B and the air humidifying modules 30C to 30E can be down sized. This is particularly effective for installation in a small location for a mounting space of, for example, a fuel cell in an automobile.

In the case that the hydrogen humidifying module 30A is disposed in the same position in the axial direction as the hydrogen humidifying module 30B and the air humidifying modules 30C to 30E, the air off gas discharge pipe 43 must be shifted further to the right than the position in FIG. 3, and the dimension L must be made larger by this amount in order to avoid interference between the air off gas discharge pipe 43 and the inlet head 34 of the hydrogen humidifying module 30A. Therefore, the humidifying unit 20 in this embodiment can make the L dimension short, and the humidifying unit 20 can be made compact.

Moreover, this invention is not limited by the embodiment described above. For example, the number of the humidifying modules is not limited to five, but could be four or less or six or greater.

As explained above, according to a first aspect of the invention, the length along the axial direction of the humidifying module in the humidifying unit for a fuel cell can be shortened, and thus the humidifying apparatus for the fuel cell can be made compact.

What is claimed is:

1. A humidifying apparatus for a fuel cell comprising a plurality of humidifying modules that humidify supply gases by transferring moisture between a reaction gas supplied to the fuel cell and a discharge gas discharged from said fuel cell, and the humidifying apparatus humidifies each of both electrodes of said fuel cell, wherein, all of the humidifying modules are disposed parallel to each other in their longitudinal direction, and at the same time, a portion of the humidifying modules among said plurality of humidifying modules is disposed so as to be shifted in their positions in said longitudinal direction relative to other humidifying modules, and in the space formed by the shifted positions, a part of a passage in which said reaction gas and said discharge gas pass through is perpendicular to said longitudinal direction and is provided in proximity to said portion of humidifying modules.

* * * * *